United States Patent [19]

Schmude et al.

[11] 4,143,732
[45] Mar. 13, 1979

[54] ORNAMENTAL GRILL FOR A MOTOR VEHICLE BODY

[75] Inventors: Leonhard Schmude, Neu-Ulm; Luan P. Hasnay, Ulm; Dieter V. Amende, Neu-Ulm; Peter Lettermann, Bernstadt, all of Fed. Rep. of Germany

[73] Assignee: Magirus-Deutz Aktiengesellschaft, Ulm, Fed. Rep. of Germany

[21] Appl. No.: 841,610

[22] Filed: Oct. 12, 1977

[51] Int. Cl.² .................... B60K 11/04; B60K 11/08
[52] U.S. Cl. ................... 180/68 P; 296/78 R; D. 12/163
[58] Field of Search ............ 180/68 P, 54 A; 296/1 A, 78 R; D12/163, 165, 171

[56] References Cited
U.S. PATENT DOCUMENTS

| 1,982,293 | 11/1934 | Green | 180/68 P |
| 3,888,327 | 6/1975 | Reece | 180/68 P |

FOREIGN PATENT DOCUMENTS 2417726  10/1975  Fed. Rep. of Germany ......... 180/68 P

*Primary Examiner*—Richard A. Bertsch
*Attorney, Agent, or Firm*—Walter Becker

[57] ABSTRACT

An ornamental molding or grill for a motor vehicle body, especially for the front section of the driver's cab of a truck, which grill is provided with a ribbed surface having air passages therethrough and extending at least over the major portion of the width of the vehicle body. The air passages are provided in substantially horizontally extending flanks of the ribs, and the space between the ribs serves as channel for the impacting air.

4 Claims, 2 Drawing Figures

ORNAMENTAL GRILL FOR A MOTOR VEHICLE BODY

The present invention relates to an ornamental molding or grill for a motor vehicle body, especially for the front section of a driver's cab of trucks, having a grilled or ribbed surface substantially extending over the width of the vehicle.

Generally ornamental grills are used to cover openings in a vehicle body, such as radiator or motor space openings. In this connection the ornamental grills must be provided with openings to permit the passage of combustion and cooling air. For this reason the ornamental grills have air inlet openings in the grill surfaces extending substantially parallel to the front section of the driver's cab. In view of these air inlet openings, however, the grill surface is interrupted to such an extent that the motor space behind the grill will become visible from the outside. This in turn, interferes with the proper purpose of the ornamental grill. Moreover, by such an interrupted grill the closed appearance of the vehicle body surface as well as the overall appearance are impaired. Furthermore, this type of ornamental grill cannot be used as air deviating device because the air impacting upon the grill is almost exclusively passed into the motor space.

It is, therefore, an object of the present invention so to improve the heretofore known ornamental grills or moldings above referred to that the above outlined drawbacks will be avoided.

This object and other objects and advantages of the invention will appear more clearly from the following specification in connection with the accompanying drawing, in which.

Figure 1:
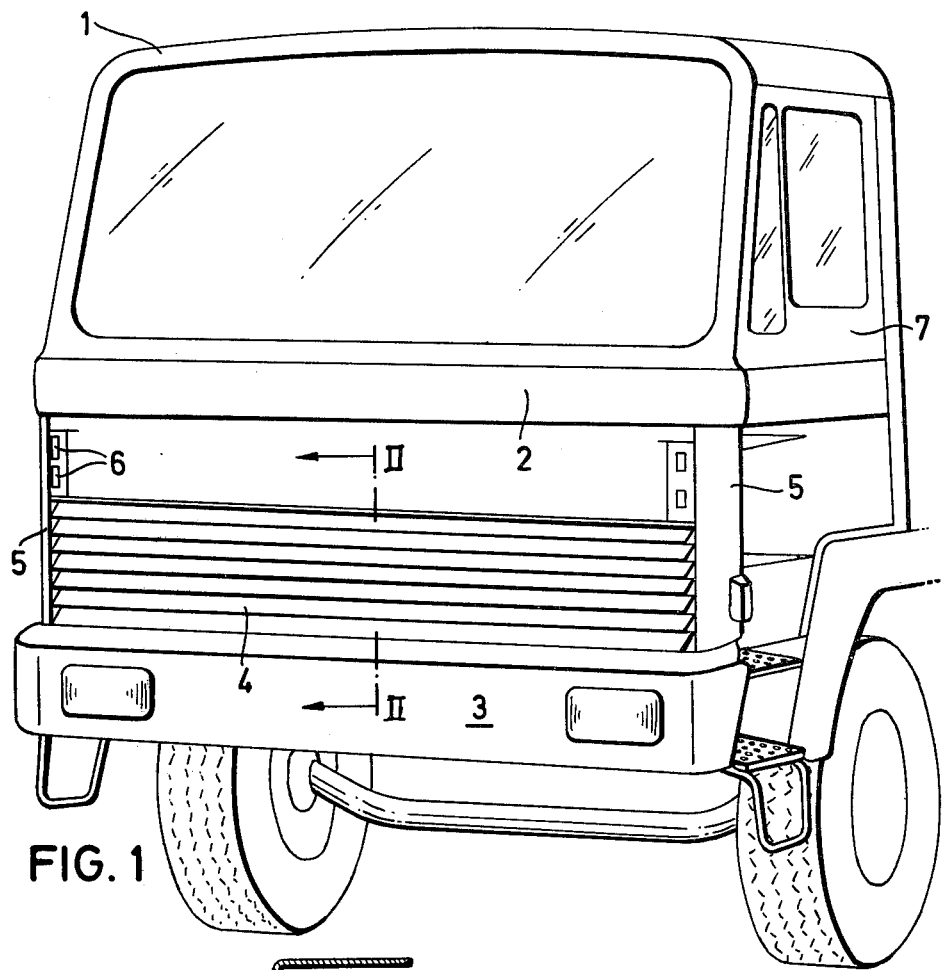
FIG. 1 is a perspective view of the front section of a cab of a truck showing the ornamental grill according to the invention.

The ornamental grill or molding for a vehicle body, which extends over the width of the vehicle is in conformity with the present invention provided with a ribbed or grilled surface having air inlet openings, and is characterized primarily in that the air inlet openings are arranged in downwardly pointing flanks of the ribs or the ribbed surface while the voids located between the ribs serve as passages for the impacting air.

In order to obtain as large air passages as possible, it is expedient that the air inlet openings in the ribs are spaced from the bottom of the ribs. If the ornamental grill is arranged in the front section of a driver's cab, it will suffice when the air inlet openings are preferably provided only in the central area of the grill.

In order to prevent that air swirls or eddies form in the air passages, it is advantageous to design the voids between the ribs in the form of rounded concave sections.

To avoid the collection of water on the individual ribs of the grill, it is suggested that the ribs, when viewed in vertical section, have a sawtooth-shaped profile or Z-shaped cross section.

Referring now to the drawing in detail, the driver's cab 1 is provided with a steep front section 2 which above the bumper 3 has an opening for the motor space located therebehind. The opening of the motor space is covered up by an ornamental grill 4 which is connected to the front section 2 so as to be able to be removed therefrom or to be pivoted to one side. Within the region of the two corner posts 5 the cab is provided with air passages 6 which are located within the vehicle body wall and in which the air which impacts upon the front section 2 of the vehicle is deviated and in the form of an air stream is passed along the two side walls 7 of the vehicle.

Figure 2:
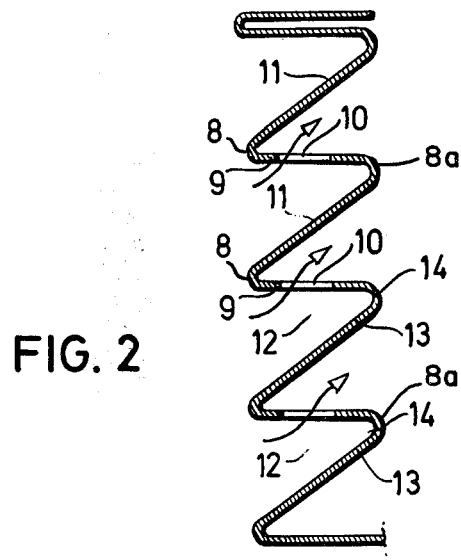
FIG. 2 is a section taken along the line II—II of FIG. 1 through the ornamental grill of the invention.

The ornamental grill 4 according to FIG. 2 has a plurality of ribs 8 extending in transverse direction with the flanks 9 substantially extending in horizontal direction. The flanks 9 are provided with inlet openings 10 through which the air can pass from the outside into the motor space. The air inlet openings 10 arranged in this way are practically invisible from the outside inasmuch as, on the one hand, they are covered up by the respective upper flanks 11 and, on the other hand, have their opening cross sections located in a horizontal plane. Due to the arrangement of the air inlet openings 10 in the flanks 9 of the ribs 8, the rear surfaces 13 located within the corners remain closed in themselves and thus serve as impact or deviating surfaces for the oncoming air. Thus a portion of the corners 12 formed between the flanks 9 and 11 of the ribs 8 represents longitudinal passages 14 by means of which a portion of the impacting air flow is directed toward the air passages 6, the other portion of the impacting air passing through the openings 10. To attain passages 14 with a relatively large cross section, the air inlet openings 10 are spaced from the rear ribs 8a.

As will be seen from FIG. 2, the ribs 8 have a sawtooth-shaped profile or a multi-Z-shaped cross section including a third arm at an incline interconnecting first and second arms parallel to each other with the lower flanks 9 extending substantially horizontally and with the upper flanks 11 extending at an incline. Due to this design of the grill, on the one hand, rain water hitting the upper flanks 11 can entirely flow off downwardly and, on the other hand, a portion of the impacting air flow is deviated by the flanks 11 to a major extent in a substantially swirl-free manner and is passed to the air inlet openings 10.

As will be seen from the above, the improvement in the ornamental grill according to the present invention results in the advantage that the space behind the grill, as for instance a motor space, is no longer visible from the outside while nevertheless air can pass through the grill into the motor space.

A further advantage of the grill according to the invention is seen in the fact that the channels defined by the rear ribs 8a are closed and thus serve as impact surfaces and air guiding passages for the impacting air. Consequently, compared to heretofore known ornamental grills, with the grill of the present invention a larger quantity of air can flow off toward both sides of the front section of the cab so that with a cab provided with lateral air deviating devices 6, even when driving slowly, the sides of the driver's cab will hardly be soiled at all.

It is, of course, to be understood that the present invention is by no means limited to the specific showing in the drawing but also comprises any modifications within the scope of the appended claims.

What we claim is:

1. A grill for a motor vehicle body, especially for the front section of a driver's cab of a truck, which comprises in combination a panel having a length equalling at least the major portion of the width of the vehicle for which said grill is intended and having a multi-Z-shaped cross section transverse to said length of said panel, each Z-shaped section of said multi-Z-shaped cross section having two arms substantially parallel and in spaced relationship to each other, each two adjacent Z-shaped sections merging with each other and having one of its two substantially parallel arms in common, each Z-shaped section also having a third arm connected and inclined to its two substantially parallel arms, at least one of said two substantially parallel arms of each Z-shaped section being provided with a corner having an air passage therethrough, those portions of adjacent Z-shaped sections which merge with each other alternately forming front and rear ribs, said air passages being located between said front and rear ribs, the insides of said rear ribs defining longitudinal channels open at both ends.

2. A grill in combination according to claim 1, in which said air passages are arranged substantially in the central region only of said grill.

3. A grill in combination according to claim 1, in which said front and rear ribs merge with each other and are rounded.

4. In combination with the front side of a motor vehicle having side walls: a grill connected to said front side and having a length equalling at least the major portion of the width of said vehicle, said grill having a multi-Z-shaped cross section transverse to said length of said grill, each Z-shaped section of said multi-Z-shaped cross section having two arms substantially parallel and in spaced relationship to each other, each two adjacent Z-shaped sections merging with each other and having one of its two substantially parallel arms in common, each Z-shaped section also having a third arm connected and inclined to its two substantially parallel arms, at least one of said two substantially parallel arms of each Z-shaped section being provided with a corner having an air passage therethrough, the inside of said rear ribs forming longitudinal channels open at both ends toward the front side of said vehicle, and said vehicle front side being provided in the region of its lateral ends with air conducting conduit means for deviating air hitting said vehicle front side and conveying it laterally outwardly along the side walls of said vehicle.

* * * * *